(12) United States Patent
Mun

(10) Patent No.: US 12,367,868 B2
(45) Date of Patent: Jul. 22, 2025

(54) ELECTRONIC APPARATUS AND CONTROLLING METHOD THEREOF

(71) Applicant: SAMSUNG ELECTRONICS CO., LTD., Suwon-si (KR)

(72) Inventor: Seongkyu Mun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 425 days.

(21) Appl. No.: 18/085,936

(22) Filed: Dec. 21, 2022

(65) Prior Publication Data

US 2023/0197065 A1 Jun. 22, 2023

(30) Foreign Application Priority Data

Dec. 21, 2021 (KR) ........................ 10-2021-0184130

(51) Int. Cl.
*G10L 15/16* (2006.01)
*G10L 21/0208* (2013.01)
*G10L 25/30* (2013.01)

(52) U.S. Cl.
CPC .......... *G10L 15/16* (2013.01); *G10L 21/0208* (2013.01); *G10L 25/30* (2013.01)

(58) Field of Classification Search
CPC ............................ G10L 15/16; G10L 21/0208
USPC ........................................................ 704/200
See application file for complete search history.

(56) References Cited

U.S. PATENT DOCUMENTS

| | | | |
|---|---|---|---|
| 10,511,908 B1 * | 12/2019 | Fisher | G06N 3/047 |
| 10,720,165 B2 | 7/2020 | Guo et al. | |
| 2007/0055516 A1 * | 3/2007 | Kakino | G10L 17/08 704/243 |
| 2022/0114593 A1 * | 4/2022 | Johnson | G06F 18/24133 |
| 2022/0114594 A1 * | 4/2022 | Nunes | G06Q 20/4016 |

(Continued)

FOREIGN PATENT DOCUMENTS

| | | | |
|---|---|---|---|
| CN | 110047490 A | * | 7/2019 |
| KR | 10-2002903 B1 | | 7/2019 |
| KR | 10-2022-0053456 A | | 4/2022 |

(Continued)

OTHER PUBLICATIONS

S. Jain, P. Jha and R. Suresh, "Design and implementation of an Automatic Speaker recognition system using neural and fuzzy logic in Matlab," 2013 International Conference on Signal Processing and Communications on Signal Processing and Communication (ICSC), Noida, India, 2013, pp. 319-324, doi: 10.1109/ICSPCom.2013.6719805. keywords: {Feat (Year: 2013).*

(Continued)

*Primary Examiner* — Bharatkumar S Shah
(74) *Attorney, Agent, or Firm* — Sughrue Mion, PLLC

(57) ABSTRACT

An electronic device includes a memory storing first vector information obtained from a pre-registered user voice, and a processor configured to obtain, based on a user voice being received, second vector information of a first filtered user voice by inputting the received user voice and the first vector information stored in the memory to a trained first neural network model, obtain second filtered user voice information by inputting the second vector information of the first filtered user voice and the received user voice to a trained second neural network model, and perform voice recognition based on the second filtered user voice information.

17 Claims, 9 Drawing Sheets

(56) References Cited

U.S. PATENT DOCUMENTS

2023/0197065 A1\* 6/2023 Mun .................. G10L 25/30
　　　　　　　　　　　　　　　　　　　704/200

FOREIGN PATENT DOCUMENTS

| KR | 1020220169242 A | 12/2022 |
| WO | 2019/145708 A1 | 8/2019 |
| WO | 2021/071489 A1 | 4/2021 |

OTHER PUBLICATIONS

S. Jain, P. Jna and R. Suresh, "Design and implementation of an Automatic Speaker recognition system using neural and fuzzy logic in Matlab," 2013 International Conference on Signal Processing and Communication (ICSC), Noida, India, 2013, pp. 319-324, doi: 10.1109/ICSPCom.2013.6719805. keywords: {Fea (Year: 2013).\*

\* cited by examiner

ELECTRONIC APPARATUS AND CONTROLLING METHOD THEREOF

CROSS REFERENCE TO RELATED APPLICATION(S)

This application is based on and claims priority under 35 U.S.C. § 119 to Korean Patent Application No. 10-2021-0184130, filed on Dec. 21, 2021, in the Korean Intellectual Property Office, the disclosure of which is incorporated by reference herein in its entirety.

BACKGROUND

1. Field

The disclosure relates to an electronic apparatus providing a voice recognition function and a controlling method thereof.

2. Description of Related Art

Recently, electronic apparatuses which have a natural language understanding model mounted to analyze a user voice, and provide a service that coincides with an intent of a user included in the user voice are being commonly supplied and used.

The electronic apparatus may provide a voice recognition function based on a voice of a user registered in a device being included in the user voice, but an issue may arise of the electronic apparatus not being able to provide the voice recognition function despite the registered voice of the user being included in the user voice when an environment using the electronic apparatus and a tone of the voice of the user is changed.

Specifically, based on the user voice which is pre-registered in the electronic apparatus and a content (sentence, etc.) included in the user voice being input to execute the voice recognition function being different, a rate of recognition of a registered user of the electronic apparatus may be even further lowered. Accordingly, there is a continuous need for a method in providing a voice recognition function that accurately recognizes the registered user in various use environments of the electronic apparatus.

SUMMARY

Provided are an electronic device which obtains filtered user voice information by inputting vector information and user voice obtained based on vector information obtained from a pre-registered user voice and the received user voice in a neural network model, and performs voice recognition based on the obtained user voice information and a controlling method thereof.

Additional aspects will be set forth in part in the description which follows and, in part, will be apparent from the description, or may be learned by practice of the presented embodiments.

According to an aspect of the disclosure, an electronic device may include a memory storing first vector information obtained from a pre-registered user voice, and a processor configured to obtain, based on a user voice being received, second vector information of a first filtered user voice by inputting the received user voice and the first vector information stored in the memory to a trained first neural network model, obtain second filtered user voice information by inputting the second vector information of the first filtered user voice and the received user voice to a trained second neural network model, and perform voice recognition based on the second filtered user voice information.

The trained first neural network model may be trained to output, based on the first vector information stored in the memory and user voice data for learning being input, third vector information of user voice data included in the user voice data for learning, and a parameter of the trained first neural network model may be updated based on a loss value obtained by comparing the output third vector information on the user voice data and ground truth data.

The trained second neural network model may be trained to output, based on the first vector information stored in the memory and user voice data for learning being input, information on user voice data included in the user voice data for learning, and a parameter of the trained second neural network model may be updated based on a loss value obtained by comparing the output information on the user voice data and ground truth data.

The trained first neural network model may be configured to use the first vector information stored in the memory and user voice data for learning as input data, and use third vector information on user voice data included in the user voice data for learning as output data, and the user voice data for learning may include the user voice data and noise data.

The trained second neural network model may be configured to use the first vector information stored in the memory and user voice data for learning as input data, and use information on user voice data included in the user voice data for learning as output data, and the user voice data for learning may include the user voice data and noise data.

The second vector information of the first filtered user voice may include third vector information of the user voice in which noise data included in the received user voice is filtered.

The processor may be further configured to obtain frequency information by Fast Fourier Transform (FFT) converting the pre-registered user voice, obtain the first vector information of the pre-registered user voice based on the frequency information, and store the obtained first vector information in the memory.

The pre-registered user voice may include a trigger voice for activating a voice recognition mode of the electronic apparatus.

According to an aspect of the disclosure, a method of an electronic apparatus may include obtaining, based on a user voice being received, second vector information of a first filtered user voice by inputting the received user voice and first vector information obtained from a pre-registered user voice to a trained first neural network model, obtaining second filtered user voice information by inputting the second vector information of the first filtered user voice and the received user voice to a trained second neural network model, and performing voice recognition based on the second filtered user voice information.

The trained first neural network model may be configured to output, based on the first vector information and user voice data for learning being input, third vector information on user voice data included in the user voice data for learning, and a parameter of the trained first neural network model may be updated based on a loss value obtained by comparing the output third vector information on the user voice data and ground truth data.

The trained second neural network model may be trained to output, based on the first vector information and user voice data for learning being input, information on user voice data included in the user voice data for learning, and a parameter of the trained second neural network model may be updated based on a loss value obtained by comparing the output information on the user voice data and ground truth data.

The trained first neural network model may be trained to use the vector information and user voice data for learning as input data, and use third vector information on user voice data included in the user voice data for learning as output data, and the user voice data for learning may include the user voice data and noise data.

The trained second neural network model may be configured to use the first vector information stored and user voice data for learning as input data, and use information on user voice data included the user voice data for learning as output data, and the user voice data for learning may include the user voice data and noise data.

The second vector information of the first filtered user voice may include third vector information of the user voice in which noise data included in the received user voice is filtered.

The method may further include: obtaining frequency information by Fast Fourier Transform (FFT) converting the pre-registered user voice; obtaining the first vector information of the pre-registered user voice based on the frequency information; and storing the obtained first vector information.

The pre-registered user voice may include a trigger voice for activating a voice recognition mode of the electronic apparatus.

According to an aspect of the disclosure, a non-transitory computer readable storage medium may store instructions that, when executed by at least one processor, cause the at least one processor to obtain, based on a user voice being received, second vector information of a first filtered user voice by inputting the received user voice and second first vector information obtained from a pre-registered user voice in a trained first neural network model, obtaining second filtered user voice information by inputting the second vector information of first filtered user voice and the received user voice in a trained second neural network model, and performing voice recognition based on the second filtered user voice information.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The disclosure will be described in detail below with reference to the accompanying drawings.

Terms used in describing embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

In the disclosure, expressions such as "have", "may have", "include", "may include", or the like are used to designate a presence of a corresponding characteristic (e.g., elements such as numerical value, function, operation, or component, etc.), and not to preclude a presence or a possibility of additional characteristics.

The expression "at least one of A and/or B" is to be understood as indicating any one of "A" or "B" or "A and B".

Expressions such as "first", "second", "1st", "2nd", and so on used herein may be used to refer to various elements regardless of order and/or importance, and it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element).

A singular expression includes a plural expression, unless otherwise specified. It is to be understood that the terms such as "include" or "configured" are used herein to designate a presence of a characteristic, number, step, operation, element, component, or a combination thereof, and not to preclude a presence or a possibility of adding one or more of other characteristics, numbers, steps, operations, elements, components or a combination thereof.

The term "module" or "part" used in the embodiments herein perform at least one function or operation, and may be implemented with a hardware or software, or implemented with a combination of hardware and software. Further, a plurality of "modules" or a plurality of "parts", except for a "module" or a "part" which needs to be implemented to a specific hardware, may be integrated to at least one module and implemented in at least one processor.

In the disclosure, the term 'user' may refer to a person who is provided with a voice recognition function through an electronic apparatus, but is not limited thereto.

Figure 1A:
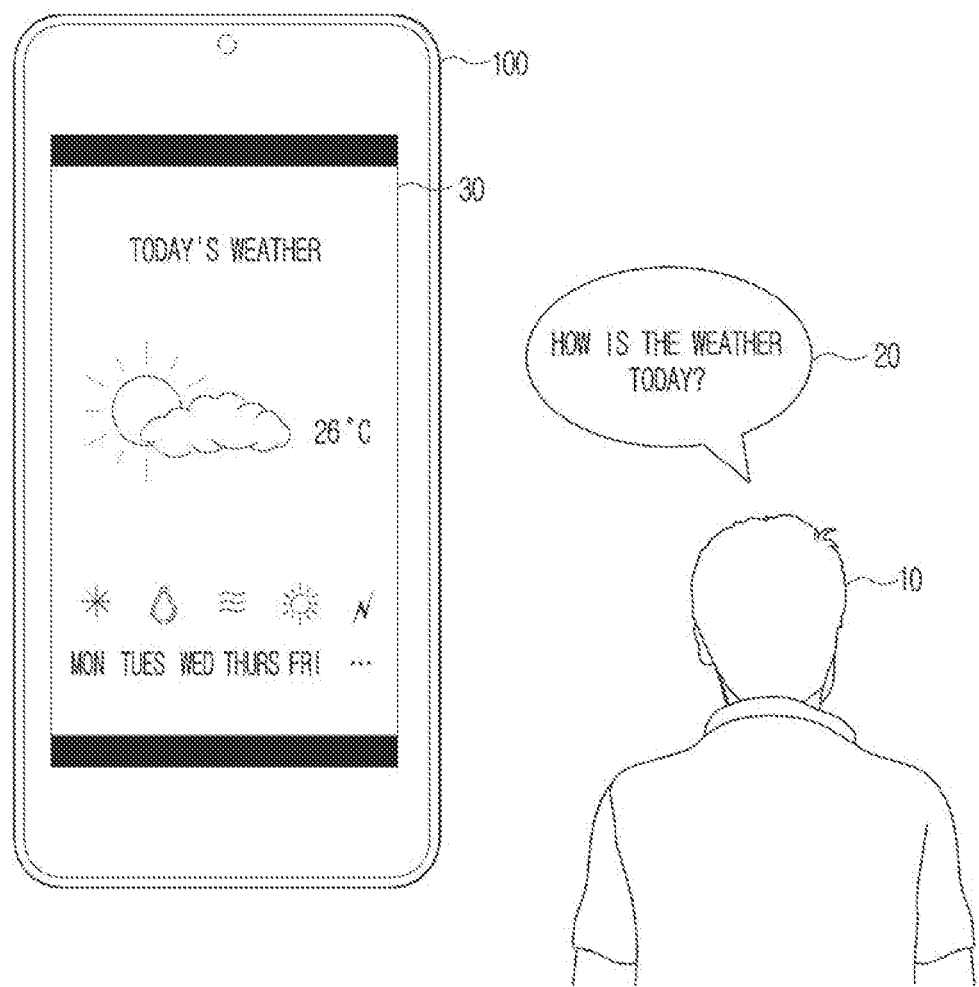
FIGS. 1A and 1B are diagrams illustrating a performing of voice recognition of an electronic apparatus according to an embodiment.
Figure 1B:
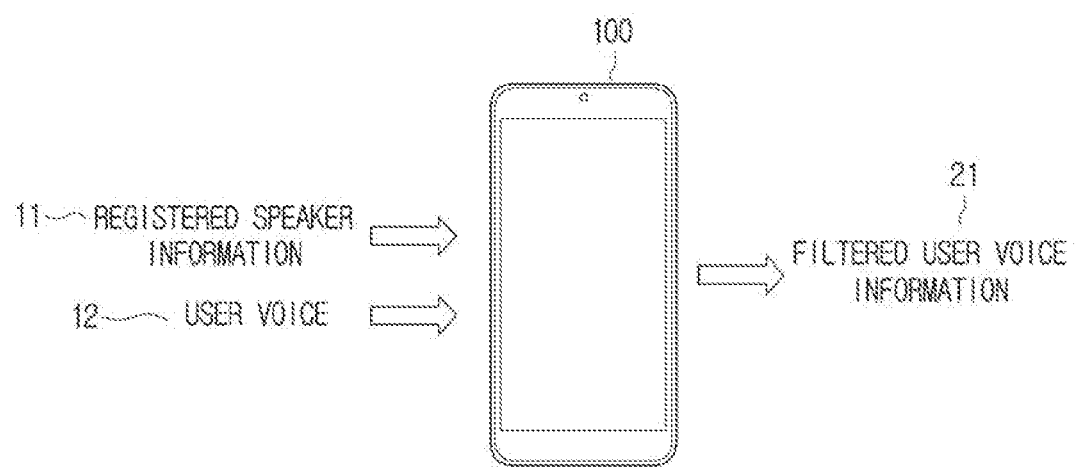

FIG. 1A and FIG. 1B are diagrams illustrating a performing of voice recognition of an electronic apparatus according to an embodiment.

Referring to FIG. 1A, the electronic apparatus 100 may provide, based on voice data corresponding to an utterance 20 of a user 10 being received, the voice recognition function corresponding to the utterance 20 by recognizing a voice of the user 10 included in the received voice data. The voice recognition function according to an example may refer to an integrated service in which based on the voice of the user being input to the electronic apparatus, providing response information to the user based on the input voice of the user.

The electronic apparatus 100 as described above may be implemented to various forms such as, for example, and without limitation, a smartphone, a tablet personal computer (PC), a mobile telephone, a video phone, an e-book reader, a desktop PC, a laptop PC, a netbook computer, a work station, a server, a personal digital assistant (PDA), a portable multimedia player (PMP), an MP3 player, a medical device, a camera, a wearable device, or the like.

For example, if the utterance 20 is "how is the weather today?", the electronic apparatus 100 may identify that the user 10 is a preregistered user based on the voice of the user 10 included in the corresponding utterance 20, and perform a weather information guide function corresponding to the utterance 20. Accordingly, the electronic apparatus 100 may provide a user interface (UI) 30 which includes information associated with the weather today.

Referring to FIG. 1B, the electronic apparatus 100 may identify whether the pre-registered voice of the user is included in the user voice 12 based on registered speaker information 11 and the received user voice 12. The registered speaker information may include vector information obtained from the pre-registered user voice, and the user voice 12 may include the voice of the user 10 and a noise of an environment using the electronic apparatus 100, but is not limited thereto.

In addition, the electronic apparatus 100 may obtain, based on identifying that the pre-registered voice of the user is included in the user voice 12, filtered user voice information 21 based on the registered speaker information 11 and the received user voice 12. The filtered user voice information 21 may include information corresponding to the utterance 20 and may be information in which the noise included in the user voice 12 is filtered.

For example, the filtered user voice information 21 may include voice information corresponding to "how is the weather today?" of which the noise is filtered from the user voice 12 which includes a noise of a space at which the user 10 is located and the user voice corresponding to "how is the weather today?".

Because the pre-registered user voice associated with the registered speaker information 11 may include the voice of the user 10 on another content (sentence, etc.) from the utterance 20, the voice recognition may not be carried out smoothly in a process in which the electronic apparatus 100 receives input of the user voice 12 corresponding to the utterance 20 and outputs the filtered user voice information 21.

To overcome the above, the electronic apparatus 100 may utilize a plurality of neural networks models. For example, the electronic apparatus 100 may obtain first filtered user voice information by inputting the registered speaker information 11 and the received user voice 12 to a first neural network model, and obtain second filtered user voice information by inputting the first filtered user voice information and the user voice 12 to a second neural network model as the filtered user voice information 21.

According to an example, because the first filtered user voice information may include the voice of the user 10 on content (sentence, etc.) which is the same as the utterance 20, the voice recognition may be carried out more accurately if the electronic apparatus 100 receives input of the user voice 12 corresponding to the utterance 20.

Various embodiments of accurately recognizing the registered voice of the user in the electronic apparatus from the utterance by utilizing the plurality of neural networks models will be described in greater detail below.

Figure 2:
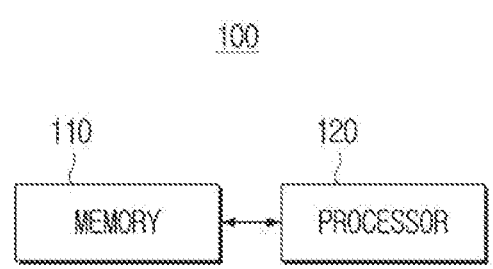
FIG. 2 is a diagram illustrating a configuration of an electronic apparatus according to an embodiment.

FIG. 2 is a block diagram illustrating a configuration of an electronic apparatus according to an embodiment.

Referring to FIG. 2, the electronic apparatus 100 may include a memory 110 and a processor 120.

The memory 110 may store data necessary for the various embodiments of the disclosure. The memory 110 may be implemented in a memory form embedded in the electronic apparatus 100 according to a data storage use, or in a memory form which is attachable to or detachable from the electronic apparatus 100. For example, the data for the driving of the electronic apparatus 100 may be stored in a memory embedded to the electronic apparatus 100, and data for an expansion function of the electronic apparatus 100 may be stored in a memory attachable to or detachable from the electronic apparatus 100. The memory embedded in the electronic apparatus 100 may be implemented as at least one of a volatile memory (e.g., a dynamic random access memory (RAM) (DRAM), a static RAM (SRAM), or a synchronous dynamic RAM (SDRAM)), or a non-volatile memory (e.g., one time programmable read-only memory (ROM) (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard disk drive (HDD) or a solid state drive (SSD)). In the case of a memory which is attachable to or detachable from the electronic apparatus 100, the memory may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., USB memory) connectable to a universal serial bus (USB) port, or the like.

The memory 110 according to an example may store the vector information obtained from the pre-registered user voice. The pre-registered user voice may be a trigger voice for activating a voice recognition mode of the electronic apparatus 100, but is not limited thereto. For example, the pre-registered user voice may be a voice corresponding to an utterance such as "hi, Bixby" or "hello, Google", and the electronic apparatus 100 may activate the voice recognition mode if the pre-registered user voice is received from the user.

The processor 120 may control the overall operation of the electronic apparatus 100. Specifically, the processor 120 may be coupled with each configuration of the electronic apparatus 100 and control the overall operation of the electronic apparatus 100. For example, the processor 120 may be coupled with the memory 110 and control an operation of the electronic apparatus 100.

According to an embodiment, the processor 120 may be designated to various designations such as, for example, and without limitation, a digital signal processor (DSP), a microprocessor, a central processing unit (CPU), a micro controller unit (MCU), a micro processing unit (MPU), a neural processing unit (NPU), a controller, an application processor (AP), and the like, but is described as the processor 120 in the disclosure.

The processor 120 may be implemented as a System of Chip (SoC) and a large scale integration (LSI), and may be implemented in a form of a field programmable gate array (FPGA). In addition, the processor 120 may include a volatile memory such as a SRAM.

A function associated with the voice recognition according to the disclosure may be operated through the processor 120 and the memory 110. The processor 120 may be configured of one or a plurality of processors. The one or plurality of processors 120 may be a generic-purpose processor such as, for example, and without limitation, a CPU, an AP, a digital signal processor (DSP), or the like, a graphics dedicated processor such as a graphic processing unit (GPU) or a vision processing unit (VPU), or an artificial intelligence dedicated processor such as a neural processing unit (NPU). The one or plurality of processors 120 may control for input data to be processed according to a pre-defined operation rule or a neural network model stored in the memory 110. Alternatively, if the one or plurality of processors 120 is an artificial intelligence dedicated processor, the artificial intelligence dedicated processor may be designed to a hardware structure specializing in the processing of a specific neural network model.

The neural network model is characterized by being created through learning. The being created through learning referred herein refers to the pre-defined operation rule or the neural network model being created to perform a desired feature (or, purpose) because the basic neural network module is trained by a learning algorithm using a plurality of learning data. The learning may be carried out in a machine itself in which an artificial intelligence according to the disclosure is performed, or carried out through a separate server and/or system. Examples of the learning algorithm may include a supervised learning, an unsupervised learning, a semi-supervised learning, or a reinforcement learning, but is not limited to the above-described examples.

The neural network model may be configured with a plurality of neural network layers. The each of the plurality of neural network layers may have a plurality of weight values, and may perform neural network processing through processing between the processing results of a previous layer and the plurality of weight values. The plurality of weight values included by the plurality of neural network layers may be optimized by the learning result of the neural network model. For example, the plurality of weight values may be updated for a loss value or a cost value obtained by the neural network model during the learning process to be reduced or minimized. An artificial neural network may include a Deep Neural Network (DNN), and examples thereof may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Deep-Q Networks, or the like, but the embodiment is not limited to the above-described examples.

The neural network model may be stored in the memory 110, or may be used by downloading the neural network model from an external server by the electronic apparatus 100, and the electronic apparatus 100 may transmit input data on the neural network model which is stored in an external server to the external server, and provide the voice recognition function based on receiving output data on the neural network model back from the external server.

The processor 120 according to an embodiment of the disclosure may obtain frequency information by Fast Fourier Transform (FFT) converting the pre-registered user voice. According to an example, the processor 120 may obtain a trigger voice (e.g., "hi, Bixby") for activating the voice recognition mode of the electronic apparatus 100 and store in the memory 110, and obtain the frequency information on the stored trigger voice.

The processor 120 may obtain the vector information of the pre-registered user voice based on the obtained frequency information. For example, the processor 120 may obtain data in a matrix form which includes the obtained frequency information, and obtain the vector information corresponding to the trigger voice to activate the voice recognition mode based on the corresponding data. In addition, the processor 120 may store the obtained vector information in the memory 110.

The processor 120 may obtain, based on receiving the user voice, first filtered user voice vector information by inputting the received user voice and the vector information stored in the memory 110 in a trained first neural network model.

The user voice may be data including user voice data corresponding to the utterance of the user and noise data on the noise of the use environment of the electronic apparatus 100. For example, the user voice may be the user voice data and the data in matrix form including the noise data, but is not limited thereto.

The first neural network model according to an example may be a model trained to output the vector information stored in the memory 110 and the vector information on the user voice data included in the user voice data for learning when the user voice data for learning is input. In addition, a parameter which is included in the first network model may be updated based on a loss value obtained by comparing the output vector information on the user voice data and ground truth data.

According to another example, the first neural network model may be a trained model which uses the vector information stored in the memory 110 and the user voice data for learning as input data, and uses vector information on the user voice data included in the user voice data for learning as output data. In this case, the user voice data for learning may include the user voice data and the noise data.

Vector information of a first filtered user voice may be the vector information of the user voice in which the noise data included in the received user voice is filtered. For example, when the user voice data corresponding to "how is the weather today?" and the noise data of an inner space which is the use environment of the electronic apparatus 100 is included in the user voice, the processor 120 may obtain the vector information of the user voice in which the noise data included in the user voice is filtered, and a similarity between the vector information of the user voice obtained, from and the vector information on the user voice corresponding to "how is the weather today?" may be greater than or equal to a pre-set threshold value.

In addition, the processor 120 may input the vector information of the first filtered user voice and the received user voice to the trained second neural network model and obtain the second filtered user voice information. The second filtered user voice information may be information on the user voice in which the noise data included in the received user voice is filtered, and the second filtered user voice information according to an example may be data in a matrix form, but is not limited thereto.

The second neural network model according to an example may be a model trained to output the vector information stored in the memory 110 and information (e.g., data in matrix form) on the user voice data included in the user voice data for learning when the user voice data for learning is input. In addition, a parameter included in the second neural network model may be updated based on the loss value obtained by comparing the output information on the user voice data and the ground truth data.

According to another example, the second neural network model may be a model trained to use the vector information stored in the memory 110 and the user voice data for learning as the input data, and use the information on the user voice data included in the user voice data for learning as the output data. In this case, the user voice data for learning may include the user voice data and the noise data.

The processor 120 may perform voice recognition based on the second filtered user voice information. For example, the processor 120 may input the second filtered user voice information to the natural language understanding model and provide the voice recognition function to an identified registered user based on the output information.

Based on the user voice data included in the received user voice being voice data on an utterance carried out from a user other than the pre-registered user, the second filtered user voice information obtained by the processor 120 by the first neural network model and the second neural network model may be information in which the user voice data on the utterance is filtered. In this case, the information output by inputting, by the processor 120, the second filtered user voice information in the natural language understanding model may include information instructing that the voice recognition function cannot be provided.

Accordingly, the processor 120 may provide, only when the user voice including voice data on the utterance carried out from the pre-registered user is received, the voice recognition function based therefrom.

Figure 3:
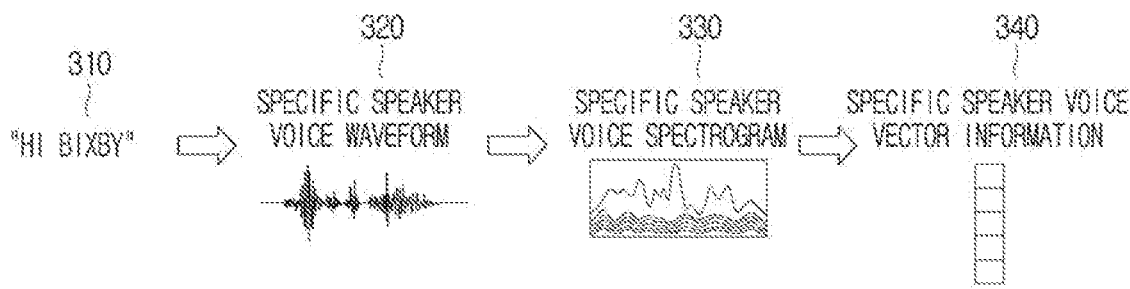
FIG. 3 is a diagram illustrating an operation of obtaining vector information from an utterance of a user according to an embodiment.

FIG. 3 is a diagram illustrating an operation of obtaining vector information from an utterance of a user according to an embodiment.

The processor 120 according to an embodiment of the disclosure may obtain voice vector information from an utterance of a registered user. When an utterance 310, which includes a trigger voice for activating the voice recognition mode of the electronic apparatus 100, is carried out by a user, the processor 120 may obtain a waveform 320 on the voice of the registered user corresponding to the relevant utterance 310.

The processor 120 may FFT convert the waveform 320 on the voice of the registered user and obtain frequency information. In addition, the processor 120 may generate a spectrogram 330 on the voice of the registered user in which a first axis is a time-axis and a second axis is a frequency-axis based on the obtained frequency information. The generated spectrogram 330 may include amplitude information corresponding to a combination of a time value and a frequency value.

The processor 120 may obtain vector information 340 on the voice of the registered user based on the generated spectrogram 330. For example, the processor may input the spectrogram 330 in a speaker recognition model and obtain the vector information 340 on the voice of the registered user.

The vector information 340 according to an example may be in a matrix form configured of 1 column and 256 rows, and each component of the matrix may have a real-value from $-3.4*10^{38}$ to $3.4*10^{38}$, but is not limited thereto.

In addition, the processor 120 may store the obtained vector information 340 in the memory 110, and then perform voice recognition based on the vector information 340 stored in the memory 110 and the received user voice when the user voice is received.

Figure 4:
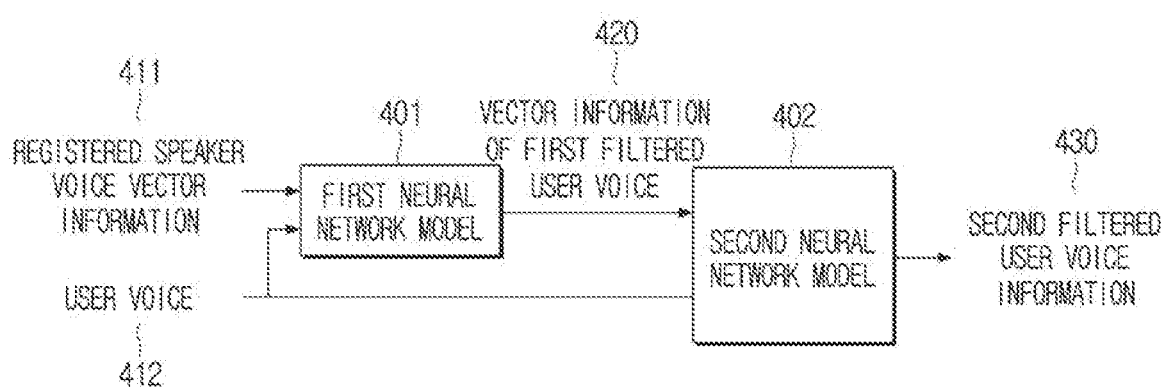
FIG. 4 is a diagram illustrating a performing of voice recognition which uses a plurality of neural networks according to an embodiment.

FIG. 4 is a diagram illustrating a performing of voice recognition which uses a plurality of neural networks according to an embodiment.

Referring to FIG. 4, the processor 120 may input vector information 411 of a pre-registered user voice stored in the memory 110 and a received user voice 412 to a first neural network model 401 and obtain vector information of a first filtered user voice 420. The received user voice 412 may include voice data of a registered user corresponding to the vector information 411 of the pre-registered user voice and the noise data of the use environment of the electronic apparatus 100.

The vector information of the first filtered user voice 420 may include the vector information of the user voice 412 in which the noise data included in the received user voice 412 is filtered. The processor 120 may input the vector information of the first filtered user voice 420 and the received user voice 412 in a second neural network model 402 and obtain second filtered user voice information 430.

If the electronic apparatus 100 utilizes the first neural network model 401 and the second neural network model 402, the vector information 420 input in the second neural network model may include vector information corresponding to an utterance which is the same as the utterance corresponding to the voice data of the registered user included in the user voice 412.

That is, if the electronic apparatus 100 only utilizes the second neural network model 402, there is the problem that the voice recognition of the apparatus 100 may not carried out accurately due to a difference between the utterance (e.g., "hi, Bixby") corresponding to the vector information 411 of the pre-registered user voice and the utterance (e.g., "how is the weather today?") corresponding to the received user voice 412. But the voice recognition of the apparatus 100 may be carried out more accurately because the utterance (e.g., "how is the weather today?") corresponding to the vector information 420 obtained through the first neural network model 401 is the same as the utterance (e.g., "how is the weather today?") corresponding to the received user voice 412.

Figure 5:
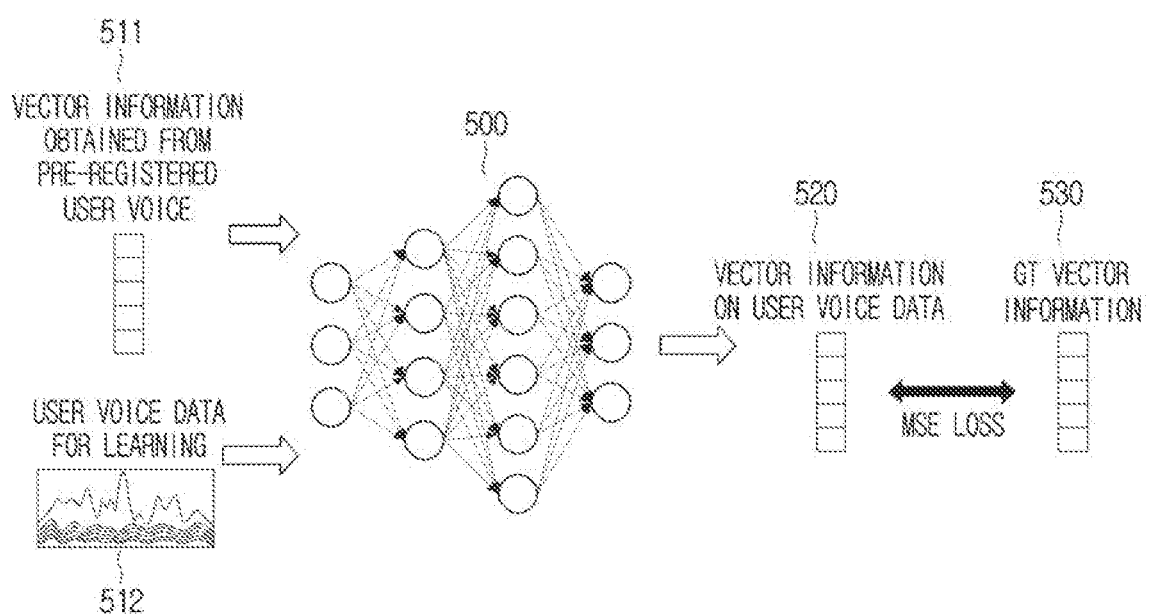
FIG. 5 is a diagram illustrating a learning process of a first neural network model according to an embodiment.

FIG. 5 is a diagram illustrating a learning process of a first neural network model according to an embodiment.

Referring to FIG. 5, a first neural network model 500 may be trained to output vector information on user voice data 520 included in user voice data for learning 512 when the vector information 511 stored in the memory 110 and the user voice data for learning 512 are input. The user voice data for learning 512 may include the voice data of the registered user and the noise data.

In a learning process, the obtained vector information 520 may be compared with ground truth (GT) vector information 530, and a parameter included in the first neural network model 500 may be updated based on a comparison result. The GT vector information 530 may include information obtained based on an utterance which is the same as the utterance corresponding to the voice data of the registered user included in the user voice data for learning 512. For example, the GT vector information 530 may include vector information obtained based on an utterance which is the same as the utterance "how is the weather today?" corresponding to the voice data of the registered user included in the user voice data for learning 512.

The obtained vector information 520 and the GT vector information 530 according to an example may be in a matrix form configured of 1 column and n-number of rows. A mean-squared error (MSE) loss value on the two vector information 520 and 530 may be calculated based on an equation below, and the parameter included in the first neural network model 500 may be updated so that the MSE loss value is decreased. The MSE may be represented as in Equation (1):

$$MSE = \frac{1}{n}\sum_{k}^{n}(y_k - t_k)^2 \qquad (1)$$

where, $y_k$ is a component of the obtained vector information, and $t_k$ is a component of the GT vector information.

That is, in the learning process of the first neural network model 500, the GT vector information 530 may be utilized as correct answer data on the utterance which is the subject of the voice recognition, and the parameter included in the first neural network model 500 may be updated so as to reduce the difference between the obtained vector information 520 and the correct answer data 530.

Figure 6:
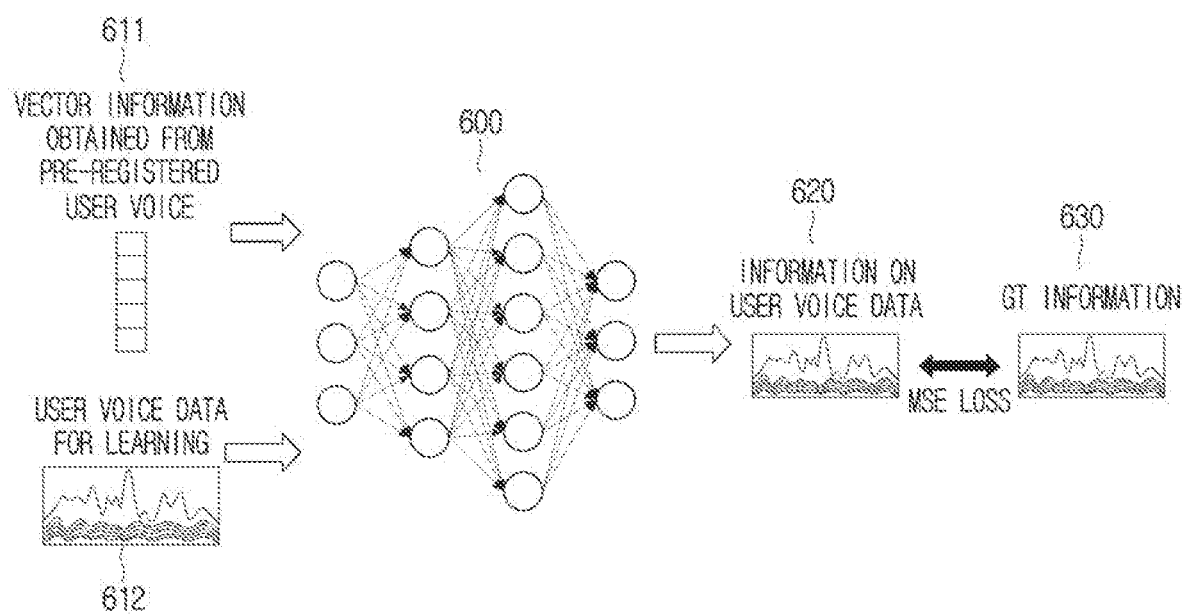
FIG. 6 is a diagram illustrating a learning process of a second neural network model according to an embodiment.

FIG. 6 is a diagram illustrating a learning process of a second neural network model according to an embodiment.

Referring to FIG. 6, a second neural network model 600 may be trained to output, based on vector information 611 stored in the memory 110 and user voice data for learning 612 being input, information on user voice data 620 included in the user voice data for learning 612. The user voice data for learning 612 may include the voice data of the registered user and the noise data, and the obtained information on user voice data 620 may be information in a matrix form, but is not limited thereto.

In a learning process, the obtained information 620 may be compared with GT information 630, and a parameter included in the second neural network model 600 may be updated based on a comparison result. The GT information 630 may include information obtained based on an utterance which is the same as the utterance corresponding to the voice data of the registered user included in the user voice data for learning 612. For example, the GT information 630 may include information in a matrix form obtained based on an utterance which is the same as the utterance "how is the weather today?" corresponding to the voice data of the registered user included in the user voice data for learning 612.

In the learning of the second neural network model 600 according to an example, a parameter included in the second neural network model 600 may be updated by a MSE loss method between the obtained information 620 and the GT information 630.

Figure 7:
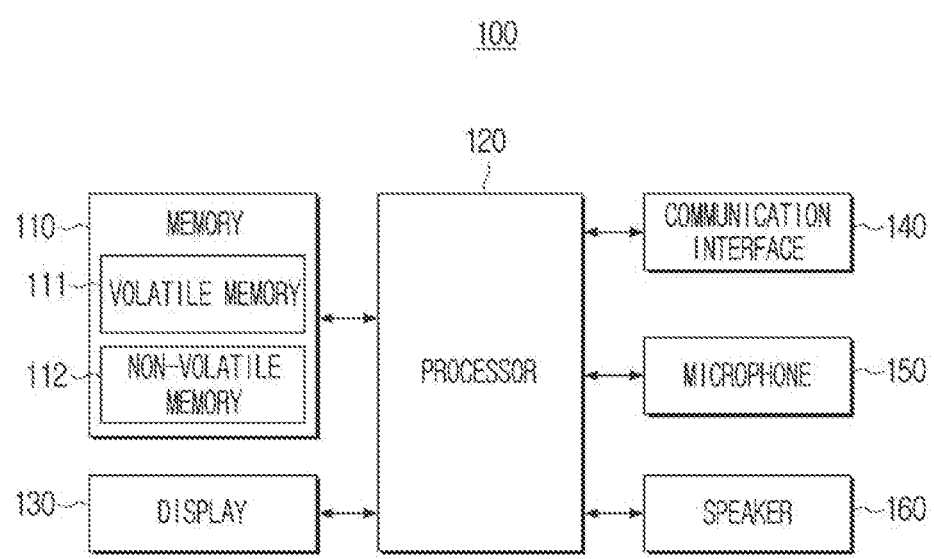
FIG. 7 is a diagram illustrating a configuration of an electronic apparatus according to an embodiment.

FIG. 7 is a diagram illustrating a configuration of an electronic apparatus according to an embodiment.

Referring to FIG. 7, the electronic apparatus 100 may include the volatile memory 111, the non-volatile memory 112, the processor 120, a display 130, a communication interface 140, a microphone 150, and a speaker 160.

The memory 110 according to an embodiment of the disclosure may include a volatile memory 111 and a non-volatile memory 112. Detailed descriptions on configurations overlapping with the configurations shown in FIG. 2 from among the configurations shown in FIG. 7 will be omitted.

Because the vector information obtained based on the pre-registered user voice by the processor 120 according to an example may be information which does not require frequent updates, the processor 120 may store the obtained vector information in the non-volatile memory 112.

Because the received user voice, the vector information of the first filtered user voice obtained through the first neural network model, and the second filtered user voice information obtained through the second neural network model may be information which does not require long-term storage, the processor 120 may store the above-described information in the volatile memory 111.

The display 130 may be implemented to a display of various forms such as, for example, and without limitation, a liquid crystal display (LCD), an organic light emitting diode (OLED) display, a quantum dot light emitting diodes (QLED), a plasma display panel (PDP), or the like. In the display 130, a driving circuit, which may be implemented in the form of a thin film transistor (TFT), a low temperature poly silicon (LTPS) TFT, an organic TFT (OTFT), or the like, a backlight unit, and the like may be included. The display 130 may be implemented as a flexible display, a three-dimensional display (3D display), a display, and the like.

The processor 120 according to an example may control the display 130 to provide the user with a graphical user interface (GUI) associated with response information corresponding to the received user voice when performing the voice recognition based on the received user voice.

The communication interface 140 may input and output data of various types. For example, the communication interface 140 may transmit and receive data of various types with an external device (e.g., source device), an external storage medium (e.g., USB memory), or an external server (e.g., WEBHARD) through a communication method such as, for example, and without limitation, an AP based Wi-Fi (e.g., Wi-Fi, wireless LAN network), Bluetooth, ZigBee, a wired/wireless local area network (LAN), a wide area network (WAN), Ethernet, IEEE 1394, a high-definition multimedia interface (HDMI), a USB, a mobile high-definition link (MHL), Audio Engineering Society/European Broadcasting Union (AES/EBU), Optical, Coaxial, or the like.

If the voice recognition function is provided based on the electronic apparatus 100 transmitting input data on the neural network model stored in the external server to the external server, and receiving output data on the neural network model back from the external server, the processor 120 may control the communication interface 140 to transmit input data on the neural network model to the external server, and control the communication interface 140 to receive the output data on the neural network model from the external server.

The microphone 150 may be a configuration for receiving a sound signal. Specifically, the microphone 150 may be a configuration which collectively designates a device that receives input of a sound wave and generates a current of a same waveform as the sound wave. Specifically, the processor 120 may control the microphone 150 to receive the voice of the user based on a user interaction (e.g., utterance corresponding to the trigger voice, etc.) of a pre-set type, and perform voice recognition by obtaining a current signal of a waveform corresponding to the received user voice.

The speaker 160 may be a device which converts an electro-acoustic signal, generated from the processor 120, corresponding to an audio provided by the electronic apparatus 100 to a soundwave. The speaker 160 may include a permanent magnet and a coil, and a diaphragm, and may output sound by vibrating the diaphragm due to electromagnetic interaction which occurs between the permanent magnet and the coil. For example, the processor 120 may control the speaker 160 to provide the user with an auditory user interface (AUI) associated with the voice recognition function.

Figure 8:
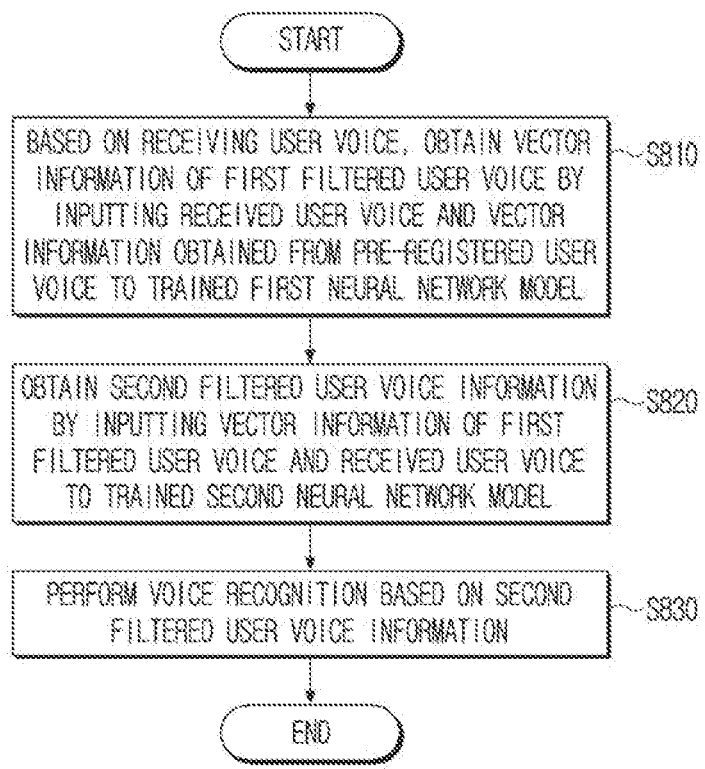
FIG. 8 is a flowchart illustrating a controlling method according to an embodiment.

FIG. 8 is a flowchart illustrating a controlling method according to an embodiment.

In operation S810, the system may obtain, based on receiving the user voice, the vector information of the first filtered user voice by inputting the received user voice and the vector information obtained from the pre-registered user voice to the trained first neural network model.

In operation S820, the second filtered user voice information may be obtained by inputting the vector information of the first filtered user voice and the received user voice to the trained second neural network model.

In operation S830, the voice recognition may be performed based on the second filtered user voice information.

The first neural network model may be trained to output the vector information on the user voice data included in the user voice data for learning when the vector information stored in the memory and the user voice data for learning is input, and the parameter included in the first neural network model may be updated based on the loss value which is obtained by comparing the output vector information on the user voice data and the ground truth data.

The second neural network model may be trained to output information on the user voice data included in the user voice data for learning when the vector information stored in the memory and the user voice data for learning is input, and the parameter included in the second neural network model may be updated based on the loss value obtained by comparing the output information on the user voice data and the ground truth data.

The first neural network model may be a model trained to use the vector information stored in the memory and the user voice data for learning as the input data, and use the vector information on the user voice data included in the user voice data for learning as the output data, and the user voice data for learning may include the user voice data and the noise data.

The second neural network model may be a model trained to use the vector information stored in the memory and the user voice data for learning as the input data, and use the information on the user voice data included in the user voice data for learning as the output data, and the user voice data for learning may include the user voice data and the noise data.

The vector information of the first filtered user voice may be the vector information of the user voice in which the noise data included in the received user voice is filtered.

The obtaining the vector information of the first filtered user voice (e.g., operation S810) may include obtaining the frequency information by FFT converting the pre-registered user voice, obtaining the vector information of the pre-registered user voice based on the frequency information, and storing the obtained vector information.

The pre-registered user voice may be the trigger voice for activating the voice recognition mode of the electronic apparatus.

According to various embodiments of the disclosure, because the electronic apparatus may accurately recognize the voice of the registered user subject to receive the voice recognition function, user convenience may be enhanced.

The methods according to the various embodiments of the disclosure described above may be implemented in an application form installable in an electronic apparatus of the related art.

The methods according to the various embodiments of the disclosure described above may be implemented with only a software upgrade or a hardware upgrade of the electronic apparatus of the related art.

The various embodiments of the disclosure described above may be performed through an embedded server provided in an electronic apparatus or through at least one external server.

The various embodiments described above may be implemented in a recordable medium which is readable by computer or a device similar to a computer using a software, a hardware, or a combination of the software and the hardware. In some cases, the embodiments described herein may be implemented by the processor 120 itself. According to a software implementation, embodiments such as the procedures and functions described herein may be implemented with separate software modules. Each of the above-described software modules may perform one or more functions and operations described herein.

The computer instructions for performing processing operations of the electronic apparatus 100 according to the various embodiments described above may be stored in a non-transitory computer-readable medium. The computer instructions stored in this non-transitory computer-readable medium may cause a specific device to perform processing operations in the electronic apparatus 100 according to the above-described various embodiments when executed by a processor of the specific device.

The non-transitory computer readable medium may refer to a medium that stores data semi-permanently rather than storing data for a very short time, such as a register, a cache, a memory, or the like, and is readable by a device. Specific examples of the non-transitory computer readable medium may include, for example, and without limitation, a compact disc (CD), a digital versatile disc (DVD), a hard disc, a Blu-ray disc, a USB, a memory card, a read only memory (ROM), and the like.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. An electronic apparatus, comprising:
a memory storing first vector information obtained from a pre-registered user voice; and
a processor configured to:
based on a user voice being received, obtain second vector information of a first filtered user voice by inputting the received user voice and the first vector information stored in the memory to a trained first neural network model,
obtain second filtered user voice information by inputting the second vector information of the first filtered user voice and the received user voice to a trained second neural network model, and
perform voice recognition based on the second filtered user voice information.

2. The electronic apparatus of claim 1, wherein the trained first neural network model is trained to output third vector information of user voice data included in user voice data for learning, based on the first vector information stored in the memory and the user voice data for learning being input, and wherein a parameter of the trained first neural network model is updated based on a loss value obtained by comparing the output third vector information on the user voice data and ground truth data.

3. The electronic apparatus of claim 1, wherein the trained second neural network model is trained to output, based on the first vector information stored in the memory and user voice data for learning being input, information on user voice data included in the user voice data for learning, and
wherein a parameter of the trained second neural network model is updated based on a loss value obtained by comparing the output information on the user voice data and ground truth data.

4. The electronic apparatus of claim 1, wherein the trained first neural network model is configured to use the first vector information stored in the memory and data for learning as input data, and use third vector information on user voice data included in the data for learning as output data, and
wherein the data for learning comprises the user voice data and noise data.

5. The electronic apparatus of claim 1, wherein the trained second neural network model is configured to use the first vector information stored in the memory and user voice data for learning as input data, and use information on user voice data included in the user voice data for learning as output data, and
wherein the data for learning comprises the user voice data and noise data.

6. The electronic apparatus of claim 1, wherein the second vector information of the first filtered user voice comprises third vector information of the user voice in which noise data included in the received user voice is filtered.

7. The electronic apparatus of claim 1, wherein the processor is further configured to:
obtain frequency information by Fast Fourier Transform (FFT) converting the pre-registered user voice,
obtain the first vector information of the pre-registered user voice based on the frequency information, and
store the obtained first vector information in the memory.

8. The electronic apparatus of claim 1, wherein the pre-registered user voice comprises a trigger voice for activating a voice recognition mode of the electronic apparatus.

9. A method of an electronic apparatus, the method comprising:
based on a user voice being received, obtaining second vector information of a first filtered user voice by inputting the received user voice and first vector information obtained from a pre-registered user voice to a trained first neural network model;
obtaining second filtered user voice information by inputting the second vector information of the first filtered user voice and the received user voice to a trained second neural network model; and
performing voice recognition based on the second filtered user voice information.

10. The method of claim 9, wherein the trained first neural network model is trained to output third vector information on user voice data included in user voice data for learning, based on the first vector information and the user voice data for learning being input, and
wherein a parameter of the trained first neural network model is updated based on a loss value obtained by comparing the output third vector information on the user voice data and ground truth data.

11. The method of claim 9, wherein the trained second neural network model is configured to output, based on the first vector information and user voice data for learning being input, information on user voice data included in the user voice data for learning, and
wherein a parameter of the trained second neural network model is updated based on a loss value obtained by comparing the output information on the user voice data and ground truth data.

12. The method of claim 9, wherein the trained first neural network model is configured to use the first vector information and data for learning as input data, and use third vector information on user voice data included in the data for learning as output data, and
wherein the data for learning comprises the user voice data and noise data.

13. The method of claim 9, wherein the trained second neural network model is configured to use the first vector information stored and user voice data for learning as input data, and use information on user voice data included the user voice data for learning as output data, and
wherein the user voice data for learning comprises the user voice data and noise data.

14. The method of claim 9, wherein the second vector information of the first filtered user voice comprises third vector information of the user voice in which noise data included in the received user voice is filtered.

15. The method of claim 9, further comprising:
obtaining frequency information by Fast Fourier Transform (FFT) converting the pre-registered user voice;
obtaining the first vector information of the pre-registered user voice based on the frequency information; and
storing the obtained vector information.

16. The method of claim 9, wherein the pre-registered user voice is a trigger voice for activating a voice recognition mode of the electronic apparatus.

17. A non-transitory computer readable storage medium configured to store a computer instruction to perform an operation by an electronic apparatus based on being executed by a processor of the electronic apparatus, the operation comprising:
obtaining, based on a user voice being received, vector information of a first filtered user voice by inputting the received user voice and vector information obtained from a pre-registered user voice in a trained first neural network model;
obtaining second filtered user voice information by inputting the vector information of first filtered user voice and the received user voice in a trained second neural network model; and
performing voice recognition based on the second filtered user voice information.

* * * * *